May 6, 1958 W. ARGUS 2,833,301
VALVE DEVICE
Filed Jan. 18, 1956
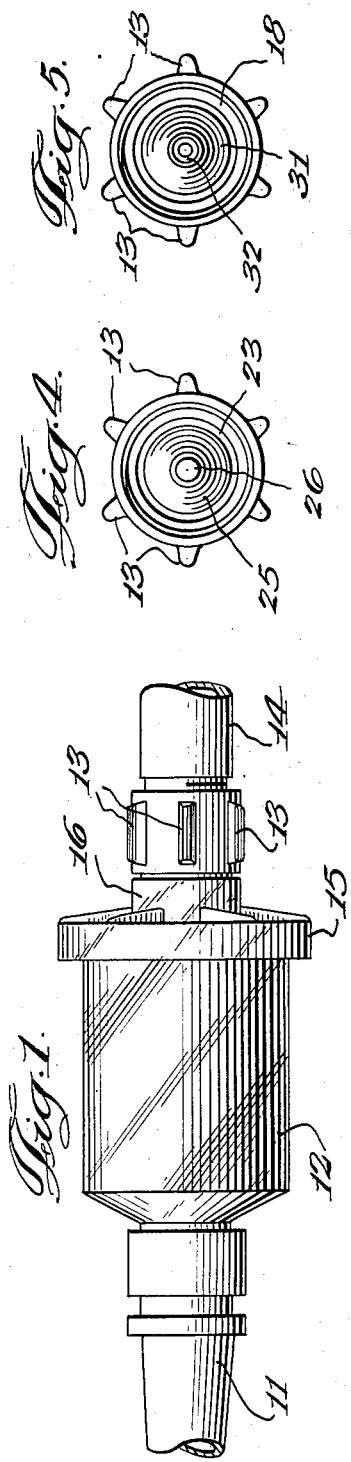
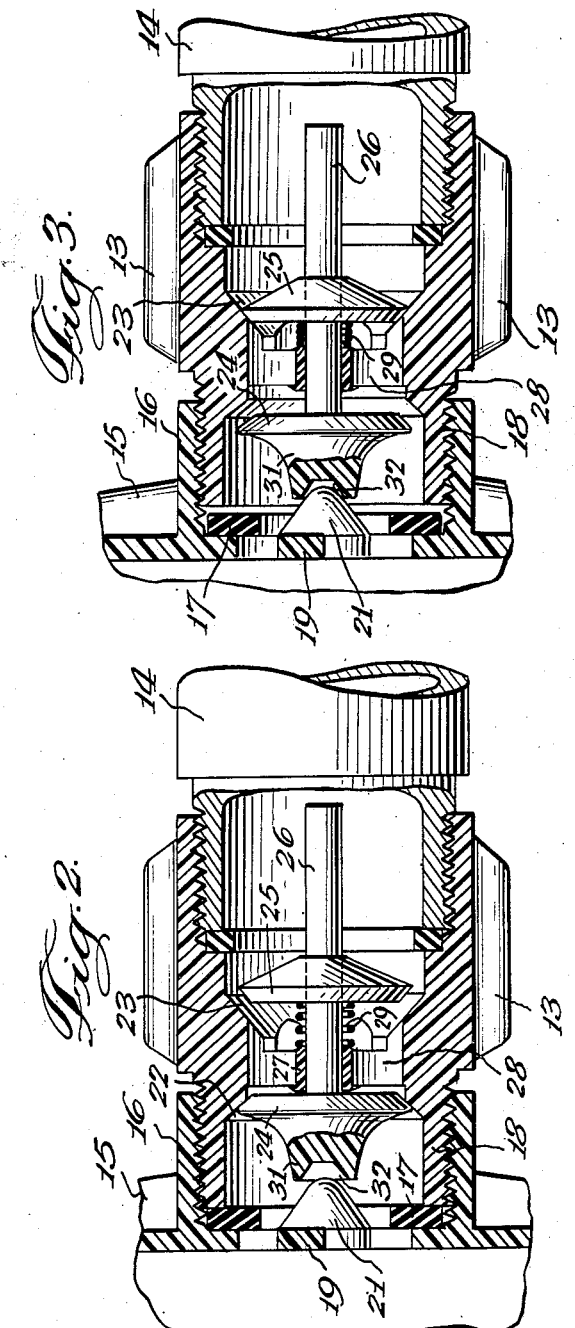

United States Patent Office 2,833,301
Patented May 6, 1958

2,833,301
VALVE DEVICE

William Argus, Chicago, Ill., assignor to Walter Ratner, Chicago, Ill.

Application January 18, 1956, Serial No. 559,887

2 Claims. (Cl. 137—329.1)

The present invention relates to a valve device for cooperative use with a lawn fertilizing device attached between a hose and a nozzle or sprinkler.

For convenience of home owners there has been devised a lawn fertilizing device which is attached between a garden hose and a nozzle or a lawn sprinkler. This fertilizing device has a chamber which contains suitable soluble material to be dissolved and sprayed over an area, such as a lawn or garden, by the nozzle or sprinkler. It is also contemplated to employ the same device to distribute a weed killer such as might be suitable for killing crab grass in lawns. It is also proposed to use the same device to dispense or spread an insecticide. For various reasons in using a device of this kind with different materials and with different applicators, such as a nozzle or sprinkler, it is desirable to have a shut-off valve and safety device interposed between the garden hose and the fertilizer device. It is particularly desirable to have an arrangement whereby any liquid or material in the fertilizing device is not siphoned into the garden hose or the water main if the supply pressure to the area is shut off. Thus, it is desired to keep the garden hose free of contamination by the fertilizer, weed killer or insecticide material.

It, therefore, is an object of the present invention to provide an improved valve device for cooperative use with a lawn fertilizing device which is attached between a garden hose and a nozzle or sprinkler.

It is a further object of the invention to provide a valve device which may be used as a manual shut-off valve to control the flow of water from a garden hose into a lawn fertilizing device.

A still further object of the invention is to provide a valve device which will preclude the flow of material from the lawn fertilizer device into the garden hose.

Other and further objects of the invention subsequently will become apparent by reference to the following description taken in conjunction with the accompanying drawings, wherein:

Figure 1 is a side view of the valve device of the present invention attached to a fertilizing device;

Figure 2 is a longitudinal cross-section of the device of Figure 1 when there is no water pressure in the hose;

Figure 3 is a longitudinal cross-section of the valve device for Figure 1 when it is being used as a water shut-off valve;

Figure 4 is a female end view of the device; and
Figure 5 is a male end view of the device.

In Figure 1 of the drawing there is shown a garden spray nozzle 11 attached to the male end of a fertilizing device 12, which in turn is connected to a valve device 13 fitted on the end of a garden hose 14. The fertilizer device 12 has a chamber, in which is located one or more water soluble cartridges which may be fertilizer, weed killer or insecticide dependent upon what is to be done. The chamber of the device 12 is accessible through a cover 15 which has a threaded female inlet 16.

The cross-sectional views shown in Figures 2 and 3 show a portion of the cover 15 with its threaded female inlet 16. At the bottom of the inlet 16 there is located a hose washer or gasket 17 which is engaged by the threaded male extremity 18 of the valve device 13. The cover 15 adjacent the washer 17 has a spider of three or four legs 19 supporting a central conical projection 21. This projection 21 is arranged to cooperate with a poppet valve structure located within the valve member 13.

The valve member 13 is provided with two oppositely arranged valve seats 22 and 23. Both of the valve seats 22 and 23 are conical in configuration and are arranged to be engaged by valve closure members 24 and 25, respectively, carried by a single valve stem 26. The valve stem 26 is supported in a bearing 27 carried by a spider or apertured structure 28. A spring 29 is interposed between the structure 28 and the bearing 27 and the underside of the poppet valve closure member 25. In the arrangement shown in Figure 2 there is no water pressure from the hose 14, and hence the spring 29 pushing against the poppet valve 25 has moved the poppet valve 24 into closed position. The poppet valve 24 in the male end portion of the valve device 13 carries a projection 31 provided with a central recess 32 adapted to be engaged by the projection 21 on the inlet of the cover device 15.

When water pressure is present in the hose 14, the valves 24 and 25 are moved toward the left until the fixed projection 21 of the threaded female inlet 16 of the device 12, is in contact with the conical recess 32 of the axial projection 31. This prevents valve 25 from engaging its seat 23, so both valves 24 and 25 are displaced from their seats, so water may flow through the device 13.

In Figure 2 the valve device 13 was inserted into the threaded inlet 16 of the cover 15 of the device 12 so that the male extremity engaged the washer 17. In Figure 3 the device 13 has been turned or partially unthreaded sufficiently so that there now is a space between the washer 17 and the extremity of the male threaded portion 18 of the device 13. It will be noted that in this position due to axial displacment of the device 13 from the cover 15 by action of the threads there is a clearance between the recess 32 of the projection 31 of the valve 24 and the projection 21 of the cover member 15. With water pressure in the hose 14, the poppet valve 25 is moved in opposition to the spring 29 to close the valve on the female end of the valve device 13. It will readily be appreciated that this operation is particularly desirable where the fertilizer device 12 is connected to a lawn sprinkler. It is also convenient to use this shut-off feature of the device 13 with a nozzle since, if it becomes necessary to replace a cartridge in the chamber of the fertilizer device 12, the water is conveniently shut off, and it is not necessary to disturb the configuration of the spray which has been adjusted by the nozzle 11.

The condition of the components disclosed in Figure 2 illustrates the safety feature provided by the present structure which prevents any siphoning of any fluid from the fertilizer device 12 into the garden hose 14 when water pressure has been cut off from the hose. Thus, there is assurance that the hose would not be apt to contain a weed killer in solution when it is desired to shift from a weed killing operation into a garden fertilizing operation. In order to shift to this latter operation, the fertilizer device 12 is removed from the valve member 13 and thoroughly cleansed and replenished with fertilizer cartridges.

While for the purpose of illustrating and decribing the present invention a preferred embodiment of the device has been shown in the drawing, it is to be understood that such variations in the components and in their arrangement are contemplated as may be commensurate with the spirit and scope of the invention set forth in the accompanying claims.

I claim as my invention:

1. In combination with a threaded female conduit having an axial member fixed therein, a tubular valve device having a female inlet and a threaded male outlet fitted into said female conduit, a pair of valve seats located between said inlet and said outlet, a pair of closure members for said valve seats, said closure members being mounted on a common axial support, one of said closure members being located between said seats and said inlet, the other closure member being located between said seats and said outlet spring means normally biasing said closure members to close the said other closure number, said closure members normally being limited in movement in the one direction toward the outlet by the axial member of said conduit which is arranged to engage said common support of said closure members thereby to position both closure members away from their respective seats when said device is fully threaded into said conduit, said closure members being capable of further movement to close the inlet valve when said device is partially unthreaded from said conduit.

2. In combination with a threaded female fluid conduit having an axial member fixed therein, a tubular valve device having a female inlet and a threaded male outlet fitted into said threaded female conduit, a pair of coaxial valve seats located between said inlet and said outlet, a pair of coaxial valve closure members for said valve seats mounted on a common reciprocable axial rod, means located between said valve seats for reciprocably supporting said axial rod, one of said valve closure members being located between said inlet and said seats, the other valve closure member being located between said outlet and said seats, and spring means surrounding said axial rod and being located between said supporting means and the valve closure member adjacent said inlet, said valve closure member adjacent said outlet having an axial portion normally adapted to engage the axial member of said threaded female conduit when said device is fully threaded into said female conduit thereby to position both closure members away from their respective seats when fluid pressure is present at the inlet of said device, said valve closure member adjacent said inlet being capable of movement toward its seat when said device is partially unthreaded from said female fluid conduit.

References Cited in the file of this patent

UNITED STATES PATENTS

| | | |
|---|---|---|
| 693,133 | Hennebohle | Feb. 11, 1902 |
| 1,005,581 | Stewart | Oct. 10, 1911 |
| 1,080,369 | Rollwing | Dec. 2, 1913 |